(12) United States Patent
Unkenholz et al.

(10) Patent No.: US 8,370,223 B2
(45) Date of Patent: Feb. 5, 2013

(54) BROADBAND INTELLIGENT EVENT REPOSITORY

(75) Inventors: Douglas Unkenholz, Homewood, AL (US); Daniel Furlong, Alabaster, AL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1554 days.

(21) Appl. No.: 11/515,623

(22) Filed: Sep. 5, 2006

(65) Prior Publication Data

US 2007/0208851 A1      Sep. 6, 2007

Related U.S. Application Data

(60) Provisional application No. 60/777,838, filed on Mar. 1, 2006.

(51) Int. Cl.
*A01K 5/02* (2006.01)
*G06F 17/50* (2006.01)

(52) U.S. Cl. ............................................. 705/29; 705/40
(58) Field of Classification Search ............... 379/32.01, 379/32.04; 705/26, 40, 53, 16, 34; 709/224, 709/229
See application file for complete search history.

(56) References Cited

U.S. PATENT DOCUMENTS

2003/0212634 A1* 11/2003 Alloune et al. ................. 705/40
2004/0143661 A1*  7/2004 Higashi et al. ................ 709/224
2005/0286686 A1* 12/2005 Krstulich .................... 379/32.01

OTHER PUBLICATIONS

"DST Output Provides Consolidated Billing Statement for RCN Corporation's Bundled Offering of Phone, Cable, and High-Speed Internet Services." PR Newswire Mar. 25, 2004 Business Dateline, ProQuest. Web. Nov. 2, 2011 (Attached).*

* cited by examiner

*Primary Examiner* — Matthew Gart
*Assistant Examiner* — Rokib Masud
(74) *Attorney, Agent, or Firm* — Hanley, Flight & Zimmerman, LLC

(57) ABSTRACT

A broadband intelligent event repository may be provided. The broadband intelligent repository may allow a cross processing life cycle phase view of an event. In addition, the broadband intelligent repository may provide for the ability to associate all recordings associated with a given event. Furthermore, the broadband intelligent repository may provide the ability to view events as they morph through the various phases of the processing life cycle. The events may occur at elements within a data network. The data network may be configured to provide at least one of the following services: voice-over-internet protocol (VOIP) communications services, video services, Internet services, and e-mail services.

18 Claims, 4 Drawing Sheets

Sample Link Data

| Link Types | Sending Application Stamp | Receiving Application Stamp |
|---|---|---|
| Event to Detail Link | E1 | D1 |
| | E1 | D2 |
| | E2 | D3 |
| | E2 | D3 |
| | E3 | D5 |
| | E3 | D6 |
| | E3 | D7 |
| | E4 | D8 |
| | E4 | D9 |
| | E5 | DA |
| | E5 | DB |
| | E6 | DC |
| | E6 | DD |
| | E7 | DE |
| | E7 | DF |
| | E8 | DG |
| | E8 | DH |
| Detail to Charge Item Link | D2 | C1 |
| | D5 | C3 |
| | D9 | C4 |
| Detail to Summary link | D4 | S1 |
| | D5 | S1 |
| | DB | S2 |
| | DC | S2 |
| | DF | S3 |
| | DG | S3 |
| Summary to Charge Item Link | S1 | C2 |
| | S2 | C5 |
| | S3 | C6 |
| Charge Item to Bill Item Link | C1 | B1 |
| | C2 | B2 |
| | C3 | B3 |
| | C4 | B3 |
| | C5 | B4 |
| | C6 | B4 |

*FIG. 4*

BROADBAND INTELLIGENT EVENT REPOSITORY

RELATED APPLICATION

Under provisions of 35 U.S.C. §119(e), Applicants claim the benefit of U.S. provisional application No. 60/777,838, filed Mar. 1, 2006, which is incorporated herein by reference.

BACKGROUND

A broadband network provides a diverse set of data oriented services to customers (e.g. users). Such data oriented services may comprise, for example, voice-over-internet protocol (VOIP) communications services, video services such as video-on-demand or broadcast television, Internet, and e-mail services. A variety of recording devices are typically deployed by a service provider in conjunction with the broadband network to capture customer usage and service events from the network. There are often multiple recording devices making recordings for a given event.

Moreover, mediation system platforms are typically utilized to gather all event recordings and process them through a set of business rules in order to select appropriate recordings as chargeable events to pass along to a rating system. The rating systems assigns charge plans to events and determines the specific charges to be billed to a customer. A variety of logical structures and algorithms are utilized to define charge plans. There can be multiple charges derived from a single usage event. Multiple events can be assimilated in order to determine an appropriate chargeable action. This can result in charge items being either individually itemized on a customer's bill or summarized to produce a single entry on a customer's bill.

Usage events morph as they pass through a sequence of life cycle stages starting as a collected and enriched event transitioning to a chargeable event item and ending up as a billed line item. Service providers generally utilize a system or collection of systems performing the collection & mediation/rating/billing operations identified above. Each of these operations creates a view of the usage event according to the operation being performed in this business flow.

In order to operate an entire business operation around the broadband network services, many supporting business processes are also required such as: a) identification of fraud, b) tracking and trending for supporting business analytics and revenue assurance, c) ensuring billing accuracy and error investigation and correction d) responding to customer inquiries and dispute resolution, e) supporting inquiries by law enforcement (CALEA). These processes often require a different analysis sequence of the usage events than what is required in order to render charges on a bill. The ability to support these processes often requires a precise correlation of event views across the various life cycle stages as well as an exact correlation of related events and related views of a single event within a single life cycle stage.

SUMMARY

A broadband intelligent event repository may be provided. A broadband intelligent event repository (BEIR) provides functionality beyond a basic data repository. An event passes through multiple phases from the time the recordings associated with the event are made until the time a charge appears on the customer's bill. A conventional data repository provides the user a flexible view only within a given phase. BIER provides a series of links that allow the user to have a consolidated view across the various phases. In addition BIER has the capability to link records associated with a given event. The ability to organize and link an event as it morphs while progressing through the processing life cycle is the key capability provided by the broadband intelligent event repository.

Both the foregoing general description and the following detailed description are examples and explanatory only, and should not be considered to restrict the invention's scope, as described and claimed. Further, features and/or variations may be provided in addition to those set forth herein. For example, embodiments of the invention may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings:

FIG. 4 is a table illustrating link data that may allow the broadband connect the multiple stages of the event together.

DETAILED DESCRIPTION

Figure 1:
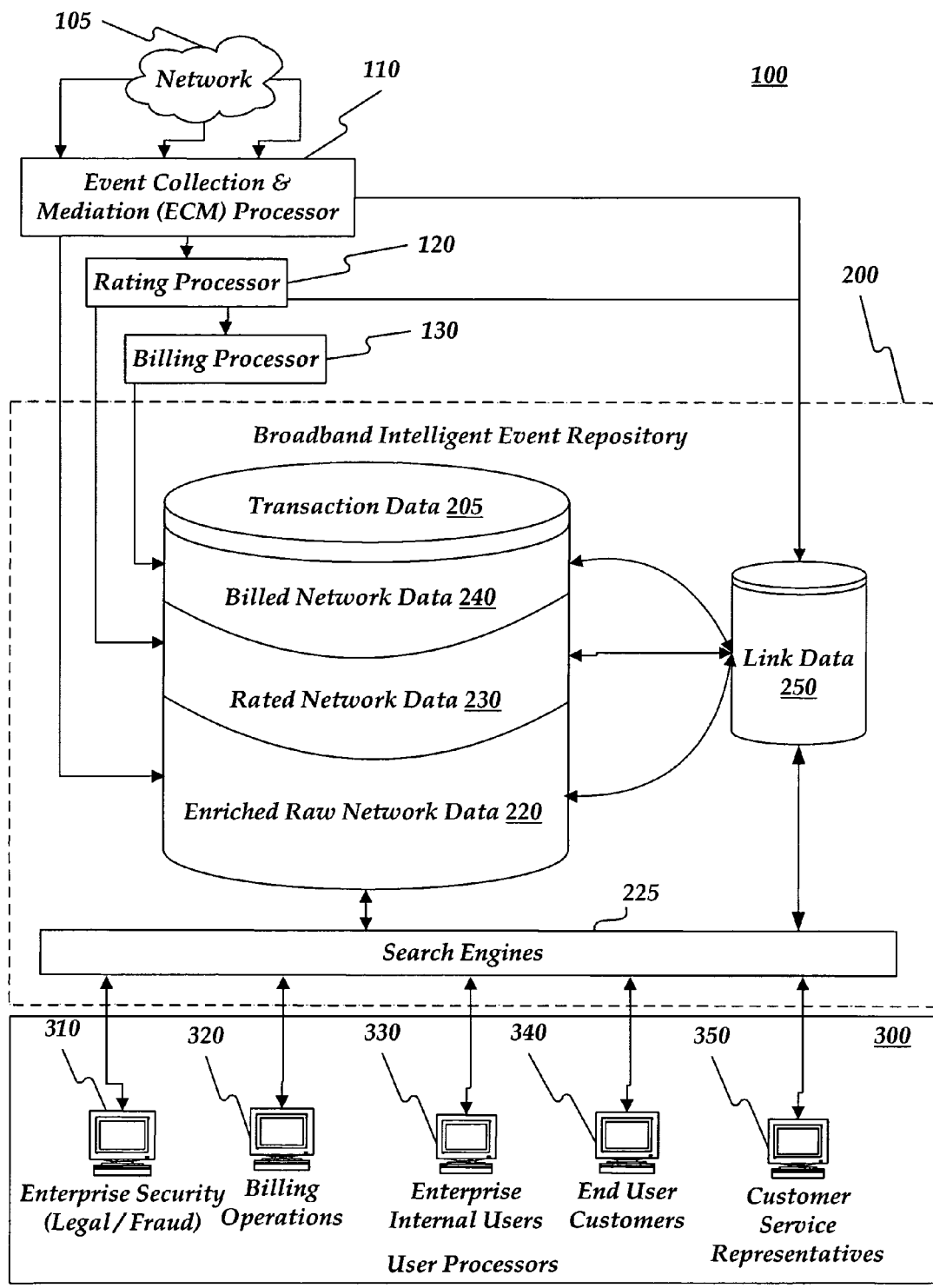
FIG. 1 is a block diagram of an operating environment for the broadband intelligent event repository.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Typical attempts to yield such results using data stores produced at the various stages of the billing process flow are cumbersome at best and often impossible. What is needed to effectively and efficiently conduct the requisite business support needs is a single repository of intelligent event data. The repository must be based upon a robust data model that can support the one to many and many to one multi-dimensional aspects of these usage events. It must also provide multiple entry points for various data sources and flexible request/response interfaces so that for any request from a user or business operation from a view at any point in the event process billing chain, a desired view of the usage event or events can be delivered. The solution to this exigent business need lies in what will be known as a broadband intelligent event repository.

For the service provider, the basic business requirements for effectively managing broadband network services are fundamentally the same as managing narrowband network services. The service provider must be able to guard against fraud and support inquiries made by law enforcement (CALEA). They must be able to ensure billing quality and support customer billing inquiries. They must be able to perform business and market analysis to ensure that the current suite of product offerings and those that are being developed will both meet customer needs as well as provide profitability for the enterprise. In order to perform these functions, often on a daily basis, a business enterprise requires a solution that provides a single point of comprehensive data that is capable of supporting the analysis of the various types of event data produced by a broadband network. The broadband intelligent event repository is capable of doing this because of its ability to consume, organize, correlate and provide this event data to the business enterprise.

A broadband intelligent event repository may be provided. The broadband intelligent repository is a single source of event data for the business enterprise. The driving force behind this concept is to contain all of the recordings and subsequent chargeable and billed transactions made for broadband service events in a utilitarian data warehouse that can both be readily accessible to the user and easily navigable in order to perform inquires and analysis. By virtue of its revolutionary concepts for linking previously unrelated data from multiple sources, the broadband intelligent event repository provides the data needed by the business enterprise in the manner desired.

Consistent with embodiments of the present invention, FIG. 1 shows a block diagram of a system 100 for providing a broadband intelligent event repository 200. As shown in FIG. 1, repository 200 includes transaction data 205, enriched raw network data 220, rated network data 230, billed network data 240, link data 250, and a search engine 225 as well as interfaces with an event collection and mediation (ECM) processor 110, a rating processor 120, a billing processor 130, and user processors 300. Processors 300 may comprise, but are not limited to an enterprise security processor 310, a billing operation processor 320, an enterprise internal users processor 330, an end user customers processor 340, and a customer service representatives processor 350.

ECM processor 110 interfaces with a network 105. Network 105 may comprise a service provider network that includes, for example, provider edge (PE) routers (not shown) and a service provider backbone (not shown). For example, network 105 may provide data services to end users using customer premises equipment. Such data services may comprise, but are not limited to, voice-over-internet protocol (VOIP) communications services, video services such as video-on-demand or broadcast television, Internet, wireless services, and e-mail services. The aforementioned are examples and other services may be provided by network 105.

ECM processor 110 will collect, format, validate, and enrich the data collected from network 105 and will pass data that will be used to create enriched raw network data 220 to broadband intelligent event repository 200. ECM processor 110 is designed to perform the aforementioned functions. ECM processor 110 may not be configured to retain event data for an extended period of time nor is it designed to support the ability to have multiple simultaneous flexible inquiries performed against the event data. Therefore, an external repository of the data produced by ECM processor 110 will need to be developed in order to support the needs of the business enterprise. Thus providing one of the primary drivers broadband intelligent event repository 200.

Rating processor 120 receives event data from ECM processor 110 that have been identified as chargeable. This data will be a subset of the data ECM processor 110 sent to broadband intelligent event repository 200. Upon receipt, the rating processor 120 will evaluate the event in order to determine the applicable rate plan and the associated charge elements. Once this is done, the event is considered rated and rating processor 120 will send data that will be used to create rated network data 230 to broadband intelligent event repository 200. Periodically rating processor 120 will submit data to billing processor 130. The billing processor 130 will place the rated events on a customer's bill and will send data that is used to create billed network data 240 to broadband intelligent event repository 200. In order to perform its base functionality, rating processor 120 does have an internal database of rated events. However, the internal database is not traditionally engineered to accommodate an extended retention period, nor does it support simultaneous access from what could literally be thousands of users. Thus providing another of the primary drivers for broadband intelligent event repository 200.

ECM processor 110, rating processor 120, and billing processor 130 are capable of producing the data needed by the business enterprise (e.g. service provider) in order to efficiently bill a broadband network offering. But they do not have the capability to link the events produced horizontally or vertically as well as support the retention and simultaneous access that may be required by the business enterprise in order to perform the following functions: a) identification of fraud; b) tracking and trending for business analytics and revenue assurance; c) ensuring billing accuracy and error investigation and correction; d) responding to customer inquiries and dispute resolution; and e) supporting inquiries by law enforcement (CALEA). Broadband intelligent event repository 200 has the capability to meet the needs of the business enterprise.

Figure 2:
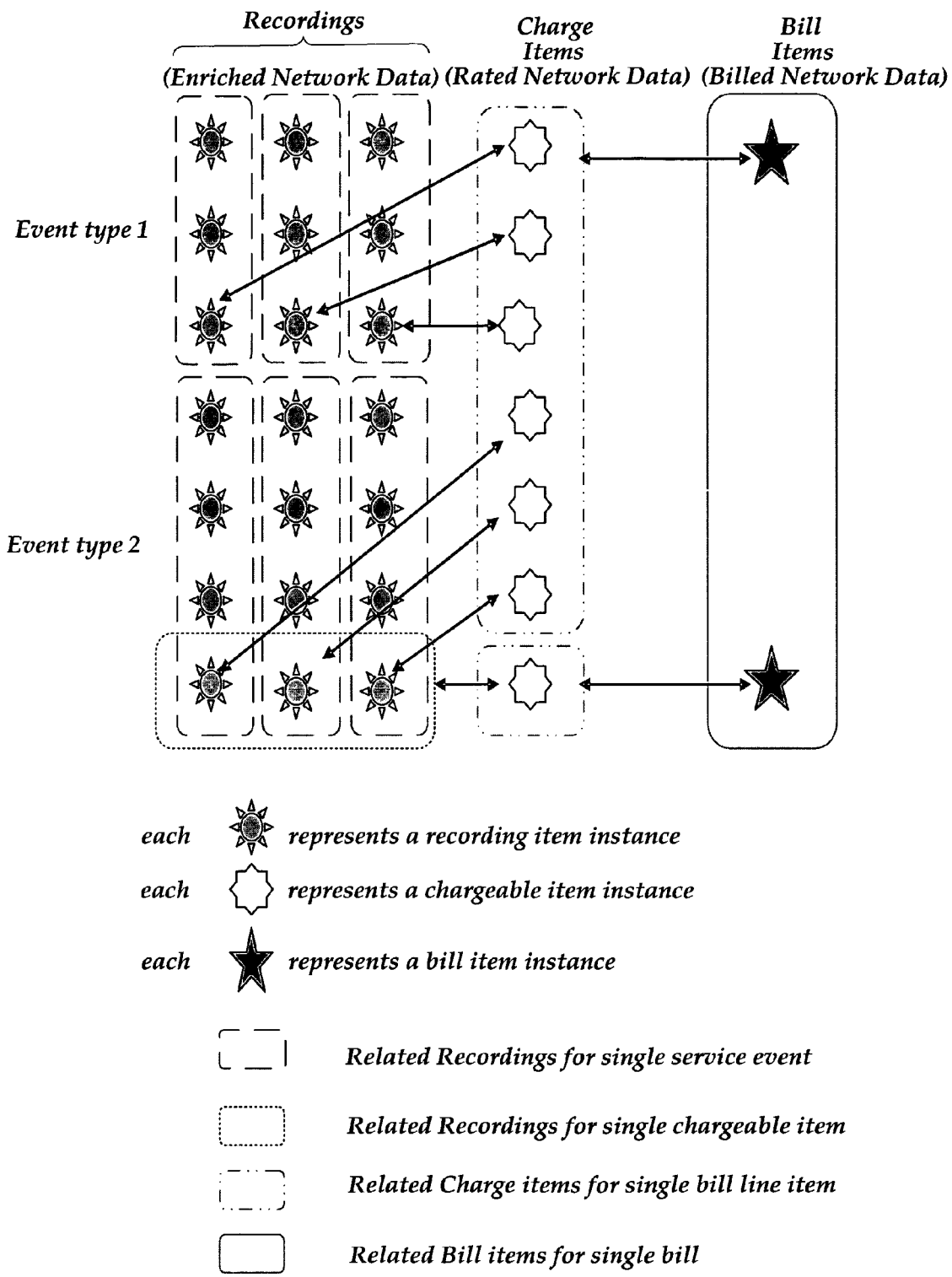
FIG. 2 is a diagram illustrating the linkage among event and processing cycle stages provided by the broadband intelligent event repository.

FIG. 2 illustrates how broadband data is interconnected. Each broadband event can generate multiple recordings. For every occurrence of a given event type, a series of related recording item instances are generated. In order for the business enterprise to have a complete view of the event, they must be able to link all the recording item instances together. The data illustrated in the recordings column of FIG. 2 is representative of the data passed from ECM processor 110 to broadband intelligent event repository 200 via in enriched raw network data 220. For each set of related recording item instances there is generally one that has sufficient information to be able to render a charge to the customer. The data from this recording item instance is what goes into the charge Items column of FIG. 2.

As illustrated in FIG. 2, there can be a one-to-one or many-to-one relationship between a recording item instance and a chargeable item instance. The data illustrated in the charge Items column of FIG. 2 is representative of the data passed from rating processor 120 to broadband intelligent event repository 200 via rated network data 230. The data that is physically presented to the end user on their bill is represented in the bill items column of FIG. 2. As illustrated in FIG. 2 there can be a one to one or many to one relationship between a chargeable item instance and a bill item instance. The data illustrated in the bill Items column of FIG. 2 is representative of the data passed from billing processor 130 to broadband intelligent event repository 200 via billed network data 240. Since there will be a series of bi-directional links between a recording item instance and its related chargeable item and also between the chargeable item instance and the bill item instance, a business enterprise user can begin analysis at any point that has occurred in the processing cycle and navigate forward or backward. Additionally, since related item instances are also linked, the business enterprise end user also has the capability to navigate within a given processing stage.

The aforementioned data already exists in its basic form. Broadband intelligent event repository 200 does not impact the manner in which ECM processor 110, rating processor 120, or billing processor 130 process event data.

Figure 3:
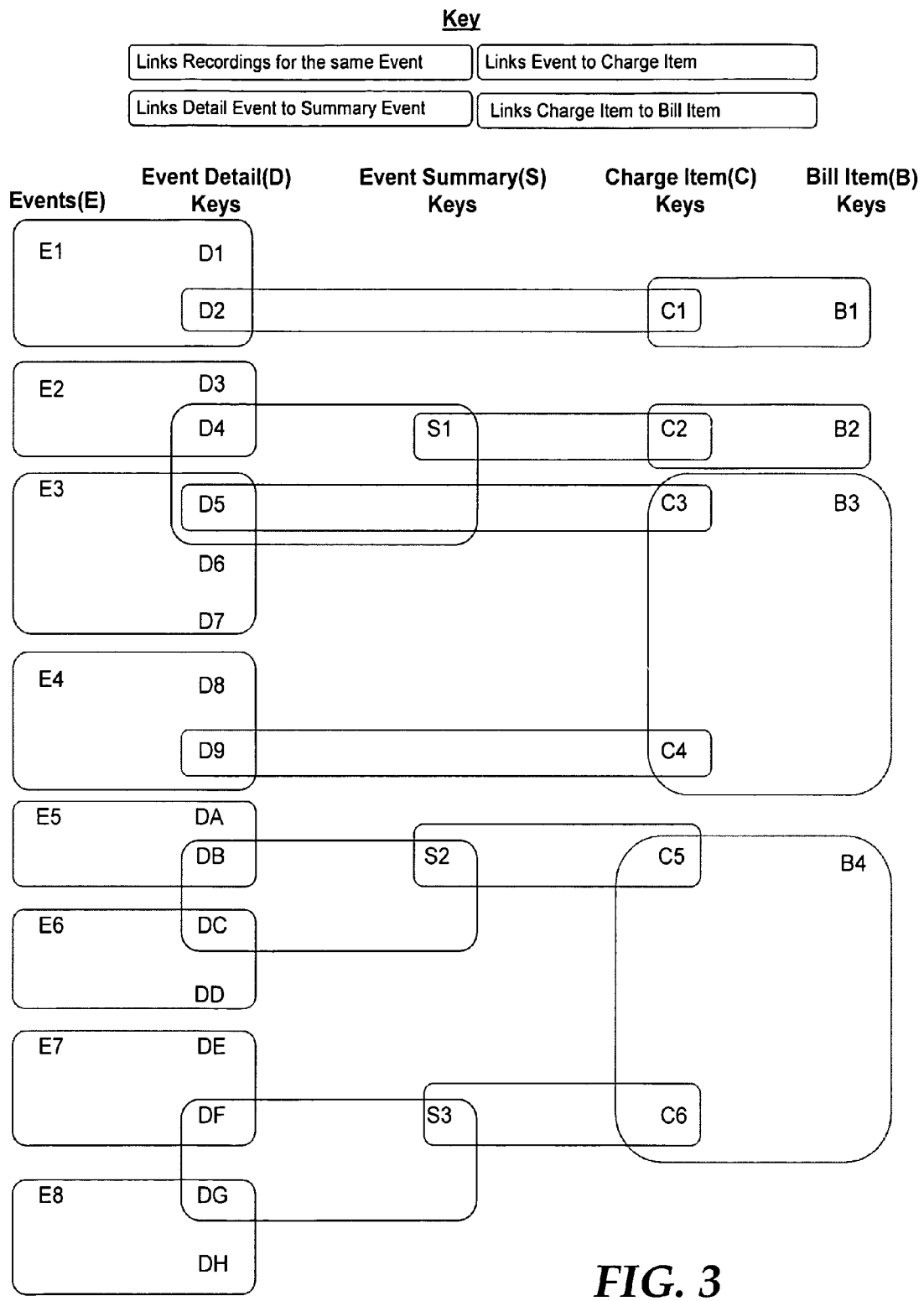
FIG. 3 is a diagram illustrating how the stamps assigned by each functional components allows event data to be linked in the broadband intelligent event repository.

FIG. 3 and FIG. 4 illustrate stamp values assigned by ECM 110, rating processor 120, billing processor 130, and the links determined by broadband intelligent repository 200. FIG. 3 shows eight distinct events. Each event has multiple recordings that are represented in the event detail keys column. ECM processor 110 will assign a unique event detail key stamp value for every recording it processes and retains for the data it sends to broadband intelligent event repository 200 via enriched raw network data 220. An event key will also be assigned that will logically connect all the recordings related to a given event. For the first event (e.g. E1) in FIG. 3, an event key of E1 has been assigned to the recordings with an event detail key of D1 and D2 because they are both related to the same event. The data ECM processor 110 passes to broadband intelligent event repository 200 that will be used to create enriched raw network data 220 will contain both the event detail key on each record along with the corresponding event key.

The D2 event detail key of event E1 is a chargeable recording. The business logic in ECM processor 110 denotes that there is a one to one relationship between the E1 recording and the record ECM processor sends to rating processor 120. The record passed to rating processor 120 will contain the event detail key D2. Rating processor 120 will determine the chargeable amount for the record and assign a unique charge item key. For record D2, rating processor 120 has assigned a charge item key value of C1. The data that rating processor 120 passes to broadband intelligent event repository 200 that will be used to create rated network data 230 will contain both the event detail key and the charge item key.

The business logic in rating processor 120 denotes that there is a one to one relationship between the C1 charge item and the record rating processor 120 sends to billing processor 130. The record passed to billing processor 130 will contain the charge item key C1. Billing processor 130 will determine where on the customer's bill the charge is to be place and assign a unique bill item key. For record C1, billing processor 130 has assigned a bill item key value of B1.

The data that billing processor 130 passes to broadband intelligent event repository 200 that will be used to create billed network data 240 will contain both the charge item key and the bill item key. Because each process that handles the event during the course of its life cycle has assigned a unique stamp value and passed that value onto the next process in the life cycle, broadband intelligent repository 200 can take this information and create a series of links. The series of links will allow the user to navigate both between the stage on the life cycle and within a stage of the life cycle.

FIG. 4 illustrates the links created by broadband intelligent event repository 200 that facilitate the ease of this navigation. Using the example of event E1, the user has the ability to see the related event details along with the associated charge and bill items. For example, if the user were reviewing event detail records and, in the process of the review, the user may discover something that 'did not look right' on event detail D1. Based on this discovery, the user may want to review all event details related to D1.

FIG. 4 shows a series of event-to-detail links that denotes what details are related to a given event. The sending application column denotes the event and the receiving application denotes the related event details. By locating the entry with D1 in the receiving application stamp, broadband intelligent event repository 200 can determine that all rows with E1 in the sending application stamp column are for the same event as D1. Consequently, an event detail with a stamp value of D2 is related to D1. If the user wanted to see if D1 was used to create any charges for a customer, they look for any entries were D1 is in the sending application stamp. This would denote that D1 was passed onto another application in the processing chain other than broadband intelligent event repository 200. When an entry for D1 is not located, it can be deduced that the event detail was not sent 'up the processing chain'. The next step is to see if event detail D2, which is related to D1, is being sent 'up the processing chain'. By repeating the process performed for D1, it can be determined that D2 is related to a record with a stamp of C1. By repeating this process, event detail can be tracked throughout the life cycle.

The D2 to C1 to B1 example displayed a simple one-to-one relationship. However, other cases exist where multiple records created by the sending application are used to create a single output record or when a given record is used in multiple output records created by a downstream event. Accordingly, link data 250 created by broadband intelligent event repository 200 can track a many-to-one relationship such as D4 and D5 that are used to create a summary S1 that in turn is used to create C2 and D2. Link data 250 tracks a detail event that is used as part of two charge items such as D5 that is used in the computation of both C2 and C3 or where multiple charge items go into a given bill item such as C3 and C4 that are used to create B3. Link data 250 can track the complex many-to-one relationship as represented in DB and DC that are used to create a summary S2 and DF and DG that are used to create a summary S3. The S2 record is used to create the C5 charge item and the S3 record is used to create the C6 charge item. The final operation in the chain is to have C5 and C6 both used to create a single bill item denoted by B4. The simple process of having the sending application and receiving applications assigning unique stamps on the data passed to broadband intelligent event repository 200 allows for the creation of keys and links that make this solution truly unique and innovative.

The following are operational examples in which user processors are used consistent with embodiments of the invention.

Example I

Enterprise Security Processor 310

In order to identify potential cases of fraud or misuse of network 105, enterprise security processor 310 needs to be able to identify spikes or abnormal patterns of usage. The types of fraud that enterprise security processor 310 could be trying to detect could be anything from a VOIP line being hacked for purposes of making free outgoing calls to a customer sharing there logon id with a group of individuals in order to allow them to have free internet access. The tool needed to be able perform this type of research effectively will have to be flexible enough to allow multiple views of the same data. This type of research requires both enriched raw network data 220 and rated network data 230.

As previously stated, conventional systems do not include a tool to facilitate flexible user inquires or retain enriched raw network data 220. Consequently, broadband intelligent event repository 200 will allow a user to view data in multiple fashions. First, a user might identify illogical situations. For example, enterprise security processor 310 may produce a list of end users that are having more than x amount of usage a month. X could represent any type of reasonable volume check, for example, bytes downloaded, hours spent surfing the net, hours spent using a VOIP phone, or number of pay per view movies requested. The data needed for this task would be found in enriched raw network data 220. Based on FIG. 3, the enterprise user would start with event detail keys that were used in end user billing. Based on link data 250 as exhibited in FIG. 4, broadband intelligent event repository 200 can see that event detail keys D4, D5, D9, DB, DC, DF and DG were sent to an upstream process. Enterprise security processor 310 would use these records as the first part of their study. After an anomaly is identified, further investigation can be done using the actual detail events that are associated with a given end user. It is at this point the business enterprise user would look for fraudulent events. For example, event details DB, DC, DF and DG result in what appears to be a significant spike in domestic long distance traffic for a given VOIP customer.

In looking at the data associated with each event, the business enterprise user notices that event detail DC does not fit the calling patterns of the other three event details, for example, it is a longer call made at a different time of day then the other calls made by this VOIP customer. By using the event key the business enterprise user can look at the other event details related to DB, DC, DF and DG in order to determine the true originating point of the call. Upon further investigation, they are able to determine that the events associated with detail events DB, DF and DG all came from an IP address that also belongs to a customer of the business enterprise that has a broadband connection. The event associated with detail event DC originated from an IP address in a different state that belongs to a 'hot spot' at a local coffee shop. The business enterprise user now has a strong suspicion that there is fraud associated with event detail DC.

If an event or series of events are considered suspicious, the business enterprise user will have the ability to gauge the revenue impact of events because of the links put in place between enriched raw network data 220 and rated network data 230 and billed network data 240. By using the example of event detail DC, the business enterprise user DC 'ups the application chain.' By following this link, the business enterprise user will be able to determine that event detail DC was used to create part of bill item key B4. Since the business enterprise user knows the duration of DC and the total amount domestic long distance traffic billed for B4, they can roughly estimate the amount for revenue lost to the business enterprise as a result of this particular fraudulent event. The ability for an enterprise user to be able to identify potential misuse and assign a revenue impact is not available with just an ECM processor, rating processor, or billing processor. It is only through the links established by broadband intelligent repository 200 that this capability is readily available to the business enterprise user.

Example II

Billing Operations Processor 320

One of the many functions performed by a billing operations group would be to ensure the validity and accuracy of bills that are being sent to end user. Part of this role involves monitoring the rated network event as they are posted to a customer's account. If a user in the billing operations group or in another area of the enterprise were to notice an anomaly such as a network recording error or an application problem that has had a negative impact on the customer's bill, a tool may be needed that can correct the situation prior to the bill being issued. For example, a recording error has been identified in a given network device that produces event associated with internet access. The error has been corrected but it needs to be determined whether or not there has been a negative impact to end user billing. First, billing operations processor 320 may identify all events in enriched raw network data 220 that originated from the network device in question during the time period the error was in effect. Since the error did not occur on other network device the billing operations user is not concerned about related detail events that may have impacted the customer's bill, only detail events that were made by this particular network device during the known timeframe.

Referring to FIG. 3, based upon the lookup performed the following event, key values are associated with recordings made by the network device in question during the time the error was in place; D2, D3 and D6. After the impacted events have been identified, a determination needs to be made to determine any associated charges. This would be done by linking the events identified in enriched raw network data 220 to rated network data 230. Since the stamps for the impacted detail events are known broadband intelligent event repository 200 would access link data 250 in order to determine if the three stamps in question had been sent to a downstream application. Since only the value of D2 appears in the sending application column of FIG. 4, it is determine that only this event was sent to a downstream application. Billing operations processor 320 would be able to correct events that have not yet been billed by creating a credit event that would negate the event that has already been rated. For events that have already been billed, the billing operations group could calculate the impact that the incorrect events had on total billing and issue an adjustment to the end user's account. This determination may be made by tracking event detail D2 through link data 250. If the charge item key C1 did not have an associated bill item key, billing operations processor 320 could correct the problem prior to the customer bill being issued. If the charge item key did have an associated bill item key, as is the case with B1, then billing operations processor 320 has sufficient information to determine the adjustment amount. Since rating processor 120 does retain rated network data 230 prior billing and typically has a small amount of billed network data after it has been billed, it does have the revenue data required to meet this business need. Since network data such as recording device is not typically pertinent to the rating processor, this information is not passed from ECM processor 110 to the rating processor 120. Therefore, all the data needed to meet this needs does not currently exist in an accessible manner. However, since broadband intelligent event repository 200 contains both enriched raw network data 220 along with rated network data 230 and billed network data 240 and has the ability to link all three components together, it is capable of meeting this business need.

Example III

Enterprise Internal Users Processor 330

One of the reasons for keeping a large amount of event data and creating a series of links that connects the various stages of the events life cycle is to be able to perform market analysis. For example, a business enterprise offers a VOIP service that allows free statewide calling for $X a month. The marketing department wants to determine the impact of creating additional packages that offer a reduced monthly rate with either a more limited free calling area or a set number of free statewide minutes and all minutes above the limit would be billed. In order to do this type of research, the marketing department would need to be able to access calling patterns of events that are not currently being billed and determine the impact of the proposed offerings. The assumption is that the only event the business enterprise user is concerned about is VOIP records that have been categorized as local or domestic long distance that originate and terminate inside the same state. This data is all contained within enriched raw network data 220. Enriched raw network data 220 has detail events that have been deemed chargeable based upon a given set of business rules as well as those that have not been deemed chargeable. All detail events could easily been enriched to contain data elements such as originating and terminating LATA, city and state as well as time of day interval. This type of data being added to the information already provided by the network device gives the user a very powerful tool that is invaluable in areas such as market analysis. By being able to see what the impact to revenue would be if they offered the lower rate with either a smaller free calling area or the plan with the bucket of free minutes, they can determine whether or not the new offerings are a good idea. This is only one example of how an enterprise internal user processor 330 would utilize the functionality provided by a broadband intelligent event repository 200. Since the repository allows the user the flexibility to navigate among the data in a wide range of fashions, it may meet the needs of an enterprise internal user.

Example IV

End User Customers Processor 340

One of the current trends in the customer care area is to allow end users of broadband services to have web based access to be able to view event data. This would enable the end user to view items such as activity logs, event charges that are due to appear on their next bill, and prior billed event history. Since this type of capability represents what, for example, could be hundreds if not thousands of concurrent users accessing both billable and non-billable event data, there will need to be an application that possess the ability to be able to both handle the user volume and be able to navigate between various data types with relative ease. As has been previously stated, ECM processor 110, rating processor 120, and billing processor 130 may not be designed or intended to handle this type of functionality. Only broadband intelligent event repository 200 has the capability to allow a user to navigate from an event on an activity log to a given line on a customer's bill or in the reverse direction as well as being able to support the simultaneous user volume.

Using FIG. 3 for the basis of the example, we can illustrate how the links created by broadband intelligent event repository 200 will allow end user customers processor 340 to be able to navigate among their respective set of data. As a result of a review, a customer may notice two line items in the bill look higher than normal, for example, bill item B2 that is a $2.75 charge for 250 minutes of use and bill item B3 that is a $5.00 charge for 275 minutes. Both line items are a summary amount, which means they cannot see the call detail only the total minutes. Since B3 is a larger charge amount, the user decides to investigate that first and request to see the call detail behind that given line on the bill. As illustrated in FIG. 4, broadband intelligent event repository 200 can backtrack to actual event by first seeing what charge item keys went into B3 and then continue to the back track process until it reaches the event detail keys. As shown in FIG. 4, bill item key B3 was made up of charge items keys C3 and C4. Charge item keys C3 and C4 were made up of event detail keys D5 and D9 respectively. It will be the data from the event details associated with event detail keys D5 and D9 that will be displayed back to the end user customer. The event detail associated with event detail key D5 is for a 200 minute VOIP call. The end user customer starts to remember, for example, a very long call to an old college friend and feels that the charge associated with bill item key B3 is correct. The user may then begin to wonder what other impact this very long call may have had on their bill so they initiate a request to see what other charges were applied to this call. Broadband intelligent repository 200 now starts the tracking process going in the other direction.

Using FIG. 4, it is able to determine that event detail key D5 went into both event summary key S1 and charge item key C3. Event summary key S1 went into charge item key C2. Charge item key C2 went into bill item key B2 and charge item key C3 went into bill item B3. It will be the data from the bill lines associated with bill items keys B2 and B3 that will be displayed back to the end user customer. The end user customer than quickly comes to the realization that there bill items that started the initial inquiry are valid and that there is not a need to perform further investigation. Because of the links and ease of navigation among the various stages in an events life cycle provided by broadband intelligent event repository 200, the end user customer can get quick answers to their questions.

Example V

Customer Service Representative Processor 350

An enterprise may be able to answer any question a customer has in regards to their bill. Therefore, when a customer has a question about a given line on their bill and that line could represent multiple events, the customer service representative will need a tool that maps a line on the bill back to the event level detail. This would allow them to inform the end user of each and every event that they are being billed. If a customer had a question about a given event, the customer service rep could then navigate vertically within all the records related to the event. As previously stated, the links established by broadband intelligent repository 200 allow for this type of data mapping with relative ease.

Referring again to FIG. 3 and FIG. 4, for this example, it may be assumed that an end user customer has a question about an international call and the domestic long distance charges that appear on their bill. The international call is represented by bill item key B1 and the domestic long distance calls are represented by bill item key B4. The end user customer calls the customer service representative concerning the bill. The customer server representative reviews the bill items in question and requests the event details associated with bill item keys B1 and B4. Referring to FIG. 4, broadband intelligent event repository 200 can back track bill item key B1 all the way back to event detail key D2 and bill item key B4 all the way back to event detail keys DB, DC, DF and DG. The customer service representative tells the end user customer the events that went into bill item key B1 and bill item key B4. The end user customer has a question about event detail keys DF and D2 and wants to know if the customer service representative can tell them the actual location from where the call originated. The customer service representative requests additional information concerning event detail key D2 and DF. Referring to FIG. 4, broadband intelligent event repository 200 is able to determine that event detail key D1 is associated with event detail key D2 and that event detail key DE is associated with event detail key DF. Based on the additional information retrieved from D1 and DE the customer service representative can identify the IP address from where the call originated and it belongs to a broadband network for a hotel in Denver. The end user customer remembers being in Denver, but was not in Denver during the time of those calls. Because broadband intelligent event repository 200 has all recordings made for an event the customer service representative is able to view all events that originated from the end user customer's number along with the location from which they originated. As a result of the request, the customer service representative is able to determine that the end user customer did in fact make several call from the Denver IP address during the prior week, and was making calls from their home broadband connection during the time the calls in question were made in Denver. The customer service representative determines that the event details D2 and DF are fraudulent and issues and adjustment to end user customer's bill. The customer service representative also reports the calls to Enterprise Security. Again, because of the unique solution for organizing and linking event data presented by the broadband intelligent event repository the customer service representative is able to answer the end user customer's questions and identify a potential fraud situation.

Example VI

CALEA Support

The Communications Assistance Law Enforcement Act of 1994 (CALEA) states that ' . . . a telecommunications carrier shall ensure that its equipment, facilities, or services that provide a customer or subscriber with the ability to originate, terminate, or direct communications are capable of . . . expeditiously isolating and enabling the government, pursuant to a court order or other lawful authorization, to access call-identifying information that is reasonably available to the carrier . . . '. The broadband intelligent event repository may take advantage of broadband network technology that allows a near real time view of network activity. There are a variety of network devices that support a streaming radius protocol. This protocol may generate an event record at the beginning of the session as well as the end of the session and allows for a real time collection of event data. The collected data may be passed and loaded to broadband intelligent event repository 200 on both a scheduled and as needed basis. Therefore, when a telecommunications carrier receives a court order or lawful authorization from a government agency, the needed data is readily available to be loaded into broadband intelligent event repository 200. Once the data is loaded, the ability to link related data and examine and analyze the data in a variety of fashions will provide the user with a flexibility that does not exist with just a file of network data. The entire process could be done in a matter of minutes, thus providing the applicable government agency access to the needed data in a manner that meets the guidelines outlined by CALEA.

Generally, consistent with embodiments of the invention, program modules executed by the user processors 300 may include routines, programs, data structures, and other types of structures that may perform particular tasks or that may implement particular abstract data types. Moreover, embodiments of the invention may be practiced with other computer system configurations, including hand-held devices, multi-processor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as show in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention. While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method to provide links within a data repository, the method comprising:
    storing in the data repository a broadband usage event;
    assigning a first key to the broadband usage event in the data repository;
    storing in the data repository a rated network datum;
    assigning a second key to the rated network datum in the data repository;
    storing in the data repository a billed network datum;
    assigning a third key to the billed network datum in the data repository;
    creating a first link between the first key assigned to the broadband usage event and the second key assigned to the rated network datum;
    creating a second link between the second key assigned to the rated network datum and the third key assigned to the billed network datum;
    receiving a request for broadband usage information corresponding to the billed network datum after the billed network datum has been generated;
    in response to the request, using a processor and the second link to determine that the rated network datum is associated with the billed network datum;
    using the processor and the first link to further determine that the broadband usage event is associated with the rated network datum; and
    retrieving the broadband usage event.

2. The method of claim 1, wherein the broadband usage event is associated with a data network.

3. The method of claim 2, wherein the data network is to provide at least one of the following services: voice-over-internet protocol communications services, video services, Internet services, and e-mail services.

4. The method of claim 2, further comprising saving data corresponding to the broadband usage event occurring at an element within the data network to a raw network database included in the data repository.

5. The method of claim 4, further comprising:
    formatting the data corresponding to the broadband usage event occurring at the element within the data network; and
    saving the formatted data corresponding to the broadband usage event occurring at the element within the data network to a formatted network database included in the data repository.

6. A system comprising:
    a first memory;
    a first processor in communication with the first memory, the first processor being programmed to:
        receive broadband usage data from a data network, the broadband usage data corresponding to broadband usage events occurring at elements within the data network, the data network to provide at least one of the following services: voice-over-internet protocol communications services, video services, Internet services, and e-mail services, and
        determine a billable event from the broadband usage data, the billable event corresponding to a portion of the broadband usage events occurring at the elements within the data network that are chargeable;
    a second memory storage,
    a second processor in communication with the second memory, the second processor being programmed to:
        create rated network data from the billable events by associating a monetary amount to each of the billable events, and
        generate billing data from the rated network data;
    a third memory;
    a third processor in communication with the third memory, the third processor being programmed to:
        store the broadband usage data in the data repository;
        assign a first key to the broadband usage data in the data repository;
        store the rated network data in the data repository;
        assign a second key to the rated network datum in the data repository;
        store billed data in the data repository;
        assign a third key to the billed data in the data repository;
        create a first link between the first key assigned to the broadband usage data and the second key assigned to the rated network data;
        create a second link between the second key assigned to the rated network data and the third key assigned to the billed data;
        receive a request for broadband usage data corresponding to the billed data after the billed data has been generated;
        in response to the request, use the second link to determine that the rated network data is associated with the billed data;
        use the first link to further determine that the broadband usage data is associated with the rated network data; and
        retrieve the broadband usage data.

7. The system of claim 6, wherein the first processor is programmed to determine the billable events from the data by applying rules to the data.

8. The system of claim 6, wherein the second processor is programmed to create the rated network data from the billable events by applying billing information associated with billing plans corresponding to customers of the data network to the billable events.

9. The system of claim 6, wherein the second processor is programmed to generate the billing data from the rated network data by changing a status associated with at least one of the billable records.

10. The system of claim 6, wherein the first processor is further programmed to save the broadband usage data corresponding to the broadband usage events occurring at the elements within the data network to a raw network database included in the data repository.

11. The system of claim 6, wherein the first processor is further programmed to save the billable events to a billable events database.

12. The system of claim 6, wherein the second processor is further programmed to save the rated network data to a rated network database included in the data repository.

13. The system of claim 6, wherein the first processor is further programmed to:

format the broadband usage data corresponding to the broadband usage events occurring at the elements within the data network; and save the formatted broadband usage data corresponding to the broadband usage events occurring at the elements within the data network to a formatted network database included in the data repository.

14. A tangible computer-readable medium which stores instructions which, when executed, cause a machine to at least:

store a broadband usage event in a data repository;

assign a first key to the broadband usage event in the data repository;

store a rated network datum in a data repository;

assign a second key to the rated network datum in the data repository;

store a billed network datum in a data repository;

assign a third key to the billed network datum in the data repository;

create a first link between the first key assigned to the broadband usage event and the second key assigned to the rated network datum;

create a second link between the second key assigned to the rated network datum and the third key assigned to the billed network datum;

receive a request for broadband usage information corresponding to the billed network datum after the billed network datum has been generated;

in response to the request, use the second link to determine that the rated network datum is associated with the billed network datum;

use the first link to further determine that the broadband usage event is associated with the rated network datum; and retrieve the broadband usage event.

15. The tangible computer-readable medium of claim 14, wherein the instructions, when executed, further cause the machine to:

format data corresponding to the broadband usage event occurring at elements within a data network; and save the formatted data corresponding to the events occurring at the elements within the data network to a formatted network database included in the data repository.

16. The tangible computer-readable medium of claim 14, wherein the broadband usage event is associated with a data network.

17. The tangible computer-readable medium of claim 16, wherein the data network is to provide at least one of the following services: voice-over-internet protocol communications services, video services, Internet services, and e-mail services.

18. The tangible computer-readable medium of claim 16, wherein the instructions, when executed, further cause the machine to save data corresponding to the broadband usage event occurring at elements within the data network to a raw network database included in the data repository.

* * * * *